Patented Aug. 25, 1931

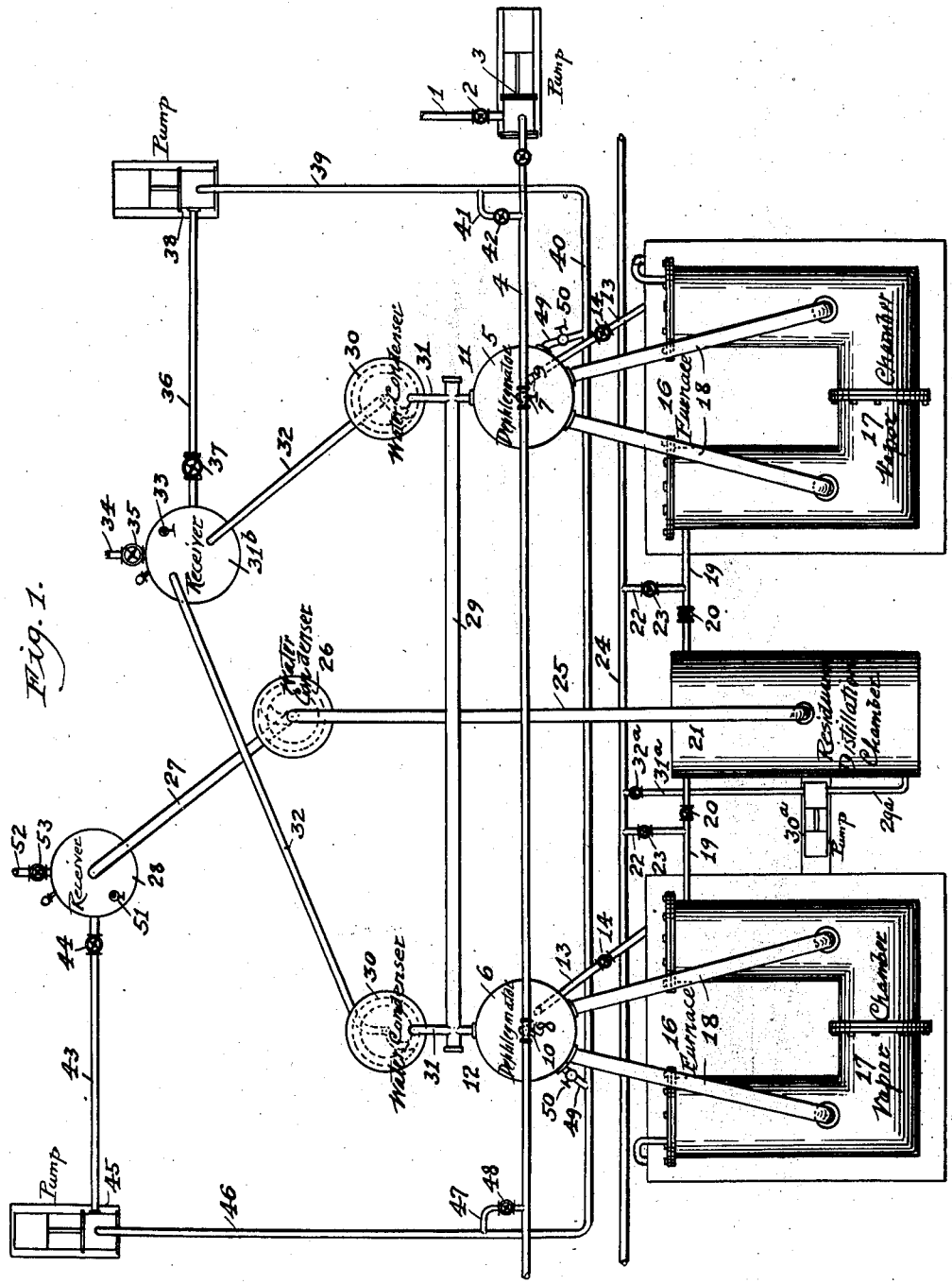

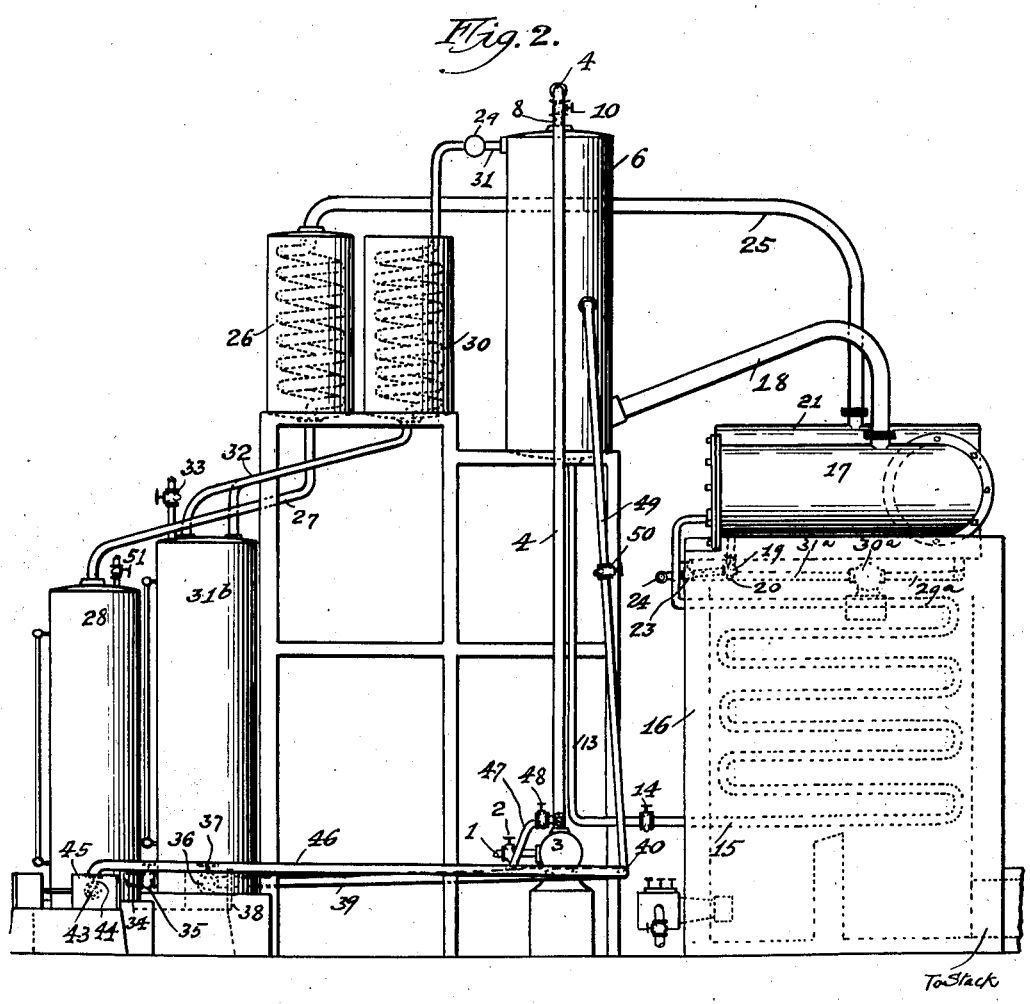

1,820,125

UNITED STATES PATENT OFFICE

CARBON P. DUBBS, OF WILMETTE, ILLINOIS, ASSIGNOR TO UNIVERSAL OIL PRODUCTS COMPANY, OF CHICAGO, ILLINOIS, A CORPORATION OF SOUTH DAKOTA

PROCESS AND APPARATUS FOR TREATING OILS

Application filed June 27, 1921, Serial No. 480,510. Renewed January 17, 1929.

This invention relates to improvements in process and apparatus for treating oils and refers more particularly to a process in which an accurate control may be had by connecting the separate units so that the pressure conditions in each may be controlled by a single pressure relief valve in a common receiver.

Among the salient objects of the invention are to provide a process in which the oil is distilled in separate units and the undistilled portion passed to a zone of reduced pressure where a secondary distillation takes place, the first stages of distillation being interconnected so that the distillate procured therefrom is collected in a common receiving tank while the distillate produced from the zone of secondary distillation under reduced pressure is collected in a separate receiving tank; to provide a process in which the distillates may be returned to be retreated or redistilled; to provide an apparatus for carrying out the above-described process.

In the drawings:

Fig. 1 is a plan view of the apparatus.

Fig. 2 is an end view of the view shown in Fig. 1.

Referring in detail to the drawings, the raw oil to be treated is introduced through the line 1 in which is interposed a valve 2 and is charged through the pump 3 into the raw oil line 4 which is positioned above the dephlegmators 5 and 6. In the drawings, I have shown but two units but any number of such units may be connected up to form a battery of stills. From the raw oil line 4 are secondary leads 7 and 8 regulated by valves 9 and 10 respectively for introducing the raw oil into the top of the dephlegmators 5 and 6. By introducing the cool raw oil in this manner, it serves as a refluxing medium for the vapors which rise in the dephlegmating or refluxing columns. The raw oil and reflux condensate are drawn off from the bottom of the dephlegmators through the lines 13 regulated by valves 14 and charged to the heating tubes 15 positioned in the furnaces 16. The oil, after being heated to a cracking temperature in the banks of heating coils is directed through tranfer lines to the vapor chambers 17 from which the vapors rise through the vapors lines 18 and are refluxed in the dephlegmating columns as explained. The unvaporized oil from the vapor chambers passes through the drawoff lines 19 regulated by valves 20 and is directed to a residuum distillation chamber 21 where the unvaporized oil is subjected to a reduced pressure. The relative difference in the pressure between the initial distillation stage and the secondary distillation stage is accurately controlled by the reducing valves 20. Instead of passing the residuum or unvaporized oil to the secondary distillation stage it may be directed through the lines 22, controlled by valves 23, to the main residuum line 24 through which it flows to storage. Being subjected to a reduced pressure in the secondary distillation stage, the unvaporized portion of the heated oil is immediately further distilled, the vapors released passing into the vapor line 25 to a condenser 26 and thence in the form of distillate through the line 27 to the receiver 28. The still unvaporized portion may be drawn off from the residuum distillation chamber through the line 29a and charged into the main residuum line through the pump 30a and connecting pipe 31a regulated by a valve 32a.

The vapors which pass off from the primary distillation stage and which are dephlegmated or refluxed by the incoming raw oil pass to a common vapor header 29 and are condensed in water condensers 30 connected thereto by means of lines 31. After being condensed to a liquid distillate therein, the distillate is collected in a common receiver 31b through the lines 32. The receiver 31b is equipped with a pressure relief valve 33 and a liquid drawoff line 34 controlled by a valve 35. A second drawoff line 36 regulated by a valve 37 serves to return the distillate by way of the pump 38 and line 39 to a common pressure distillate line 40 extending parallel to the raw oil and the residuum lines. A secondary connecting line 41 controlled by a valve 42 furnishes a means for short-circuiting any desired portion of the returned pressure distillate and charging it with the incoming raw oil to be introduced into the top of the dephlegmators. In the same manner, the distillate which is collected in the receiver 28 may be returned through the drawoff line 43 regulated by a valve 44 and charged through the pump 45, and return line 46, to the pressure distillate line 40 or in a similar manner through the secondary connecting line 47 regulated by a valve 48 to the raw oil line 4. The distillate returned to the line 40 from the receivers 31ᵇ and 28 may be introduced to the dephlegmators through the lines 49 in which are interposed the valves 50. These return lines are tapped into the dephlegmator about half way up from the bottom, thus affording the returned distillate an opportunity for being redistilled by vapors at a higher temperature than those to which it would be subjected were it introduced with the raw oil at the top of the dephlegmating column. In this manner, the vapors as they rise from the dephlegmator are first refluxed by contacting with the pressure distillate from the receivers and on further travel come in contact with the cooler raw oil which is introduced at the tops of the columns. This method of procedure provides a more complete conversion of the oil and serves to redistill to a great extent the pressure distillate returned from the respective receivers.

As mentioned, a number of units of the type explained, may be connected up and in doing so, the vapor header 29 would be extended so as to connect with the adjoining units. Also, two or more units would have a common receiver so that pressure conditions in the different units at all times would remain identical and the pressure control regulated accurately by the pressure relief pipe in the single master receiver. The receiver 28 is similarly equipped with a pressure relief valve 51 and a liquid drawoff line 52 controlled by a valve 53, which serve to control the reduced pressure in the secondary zone of distillation and supply a means for drawing off the pressure distillate from the receiver 28 from the system when it is not desired to return the same through the line 43 and pump 45. The completeness of conversion together with the ease and accessibility of control which are maintained uniform by the interconnected vapor header and common receiver construction provides an apparatus which is admirably adapted for the conversion of hydrocarbons to produce lower boiling point hydrocarbons such as distillate adaptable for refining to make products such as benzine, gasoline, kerosene and the like.

By operating with gas oil of approximately 30 to 32 degrees Baumé, and maintaining a pressure of substantially 150 pounds in the primary distillation stage and pressures from 50 pounds to atmospheric in the secondary distillation stage, and by returning the distillates for retreatment as described, a yield of from 50 to 65% of high grade distillate having a Baumé gravity of 48 to 52 degrees, may be procured in this type of apparatus.

I claim, as my invention:

1. A continuous process for cracking oil, consisting in initially heating and vaporizing the oil in separate interconnected zones, in maintaining a uniform pressure in said zones, in passing the evolved vapors through dephlegmators, in condensing the dephlegmated vapors and collecting the distillate produced in said zones in a single reservoir, in continuously passing the unvaporized oil from said zones to a zone of reduced pressure to cause further distillation thereof, in condensing and collecting the vapors released in said latter zone, and in returning the distillate produced in said initial and reduced pressure zones to said dephlegmators to simultaneously dephlegmate the evolved vapors and re-distill portions of such distillate.

2. A continuous process for cracking hydrocarbon oil, consisting in initially heating and vaporizing the oil in separate interconnected zones, in maintaining a uniform pressure on said zones, in passing the evolved vapors through dephlegmators, in condensing the vapors issuing from said dephlegmators and collecting the distillate in a single reservoir, in continuously passing unvaporized oil from said zones to a zone of reduced pressure to cause further distillation thereof, in condensing and collecting the vapors released in said zone of reduced pressure, in returning distillate produced in the initial zones and in said reduced pressure zone to a stream of raw oil to be introduced therewith into said dephlegmators to act as a dephlegmating medium for the evolved vapors.

3. In an apparatus for converting oil, the combination with a plurality of interconnected units comprising heating, vaporizing, refluxing and condensing means, of independent vapor lines and common distillate collecting means to permit a unitary control of the pressure in the separate units, means for transferring the unvaporized oil from said units to a zone of reduced pressure, means for separately condensing and collecting the distillate produced in said latter zone, and means for returning the separate distillates to said refluxing means, and means for continuously supplying raw oil to said interconnected units.

4. A method of heat treating hydrocarbon oils to produce lower boiling point products which consists in heating the oil to a cracking temperature under superatmospheric pressure, passing the vapors to a zone of dephlegmation, passing charging oil for the process in heat interchange relation with vapors in one portion of the zone of dephlegmation, passing residual oil from the cracking operation to a zone of reduced pressure wherein flash distillation takes place, condensing the flash distilled vapors, passing the distillate therefrom in heat interchange relation with vapors in a portion of said dephlegmation zone which is at a higher temperature than the portion to which the charging oil is subjected.

5. A process for the pyrogenetic treatment of mineral oils, which consists in heating the oil to a cracking temperature under superatmospheric pressure, passing the evolved vapors to a zone of dephlegmation, portions of which are maintained at different temperatures, passing the vapors therefrom to a zone of condensation to form a distillate, and returning at least a portion of said distillate to a cooler portion of said zone of dephlegmation, withdrawing residual oil from the cracking operation and passing it to a zone of reduced pressure wherein flash distillation takes place, condensing the flashed vapors and returning at least a portion of the flash distilled distillate to a hotter portion of said zone of dephlegmation.

6. A process for the pyrogenetic treatment of mineral oils, which consists in heating the oil to a cracking temperature under superatmospheric pressure, passing the evolved vapors to a zone of dephlegmation, portions of which are maintained at different temperatures, passing the vapors therefrom to a zone of condensation to form a distillate, and returning at least a portion of said distillate to a cooler portion of said zone of dephlegmation, withdrawing residual oil from the cracking operation and passing it to a zone of reduced pressure wherein flash distillation takes place, condensing the flashed vapors and returning at least a portion of the flash distillate to a hotter portion of said zone of dephlegmation, introducing charging oil for the process to one of said distillates to pass therewith to the zone of dephlegmation.

7. A process for the pyrogenetic treatment of mineral oils, which consists in heating the oil to a cracking temperature under superatmospheric pressure, passing the evolved vapors to a zone of dephlegmation, portions of which are maintained at different temperatures, passing the vapors therefrom to a zone of condensation to form a distillate, and returning at least a portion of said distillate to a cooler portion of said zone of dephlegmation, withdrawing residual oil from the cracking operation and passing it to a zone of reduced pressure wherein flash distillation takes place, condensing the flashed vapors and returning at least a portion of the flash distillate to a hotter portion of said zone of dephlegmation, introducing charging oil for the process to one of said distillates to pass therewith to the zone of dephlegmation in direct physical contact with the vapors therein.

8. A method of heat treating hydrocarbon oils to produce lower boiling point products which consists in heating the oil to a cracking temperature under superatmospheric pressure, passing the vapors to a zone of dephlegmation, passing charging oil for the process in direct heat interchange relation with vapors in one portion of the zone of dephlegmation, passing residual oil from the cracking operation to a zone of reduced pressure wherein flash distillation takes place, condensing the flash distilled vapors, passing the distillate therefrom in direct heat interchange relation with vapors in a portion of said dephlegmation zone which is at a higher temperature than the portion to which the charging oil is subjected.

9. A hydrocarbon oil cracking process which comprises subjecting the oil to cracking conditions of temperature and pressure, passing evolved vapors to a dephlegmating zone, portions of which are maintained at different temperatures, removing uncondensed vapors from said dephlegmating zone and subjecting the same to condensation thereby forming distillate, introducing charging oil for the process to a cooler portion of said dephlegmating zone, withdrawing residual oil from the cracking operation and passing it to a zone of reduced pressure wherein flash distillation takes place, condensing the flashed vapors and returning at least a portion of the flash distilled distillate to a hotter portion of said dephlegmating zone.

10. A hydrocarbon oil cracking process which comprises subjecting the oil to cracking conditions of temperature and pressure in a pressure zone, passing evolved vapors to a dephlegmating zone, removing uncondensed vapors from said dephlegmating zone and subjecting the same to condensation thereby forming final distillate, removing unvaporized oil from said pressure zone and passing the same to a pressure reduction zone wherein flash distillation takes place, condensing the flashed vapors thereby forming flash distillate, and introducing to said dephlegmating zone portions of said final distillate and flash distillate to act as dephlegmating mediums therein.

CARBON P. DUBBS.